(12) United States Patent
Amine et al.

(10) Patent No.: US 9,559,354 B2
(45) Date of Patent: Jan. 31, 2017

(54) ELECTRODE MATERIALS

(75) Inventors: Khalil Amine, Oak Brook, IL (US); Ali Abouimrane, Naperville, IL (US); Ilias Belharouak, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 881 days.

(21) Appl. No.: 13/115,308

(22) Filed: May 25, 2011

(65) Prior Publication Data

US 2011/0294006 A1    Dec. 1, 2011

Related U.S. Application Data

(60) Provisional application No. 61/349,062, filed on May 27, 2010.

(51) Int. Cl.
| | | |
|---|---|---|
| H01M 4/02 | (2006.01) |
| H01M 4/525 | (2010.01) |
| B05D 5/12 | (2006.01) |
| H01M 4/1391 | (2010.01) |
| H01M 4/1397 | (2010.01) |
| H01M 4/36 | (2006.01) |

(52) U.S. Cl.
CPC ......... *H01M 4/1391* (2013.01); *H01M 4/1397* (2013.01); *H01M 4/366* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 6,749,648 | B1* | 6/2004 | Kumar | B82Y 30/00 |
| | | | | 29/623.1 |
| 6,939,640 | B2* | 9/2005 | Kourtakis | 429/524 |
| 2004/0157126 | A1* | 8/2004 | Belharouak | H01M 4/136 |
| | | | | 429/231.8 |
| 2004/0247872 | A1* | 12/2004 | Sudo et al. | 428/402.24 |
| 2005/0069775 | A1* | 3/2005 | Hwang et al. | 429/231.95 |
| 2007/0003822 | A1* | 1/2007 | Kocha et al. | 429/44 |
| 2007/0175020 | A1* | 8/2007 | Nagata et al. | 29/623.3 |
| 2008/0286656 | A1* | 11/2008 | Cho et al. | 429/231.95 |

OTHER PUBLICATIONS

K. Amine, High-temperature storage and cycling of C-LiFePO4/graphite Li-ion cells, 2005, Electrochem Commun, 7, 669-673.*
Nakajima, N. et al., "Surface metallic nature caused by an in-gap state of reducted NiO: a photoemission study," J. of Electron Spectroscopy and Related Phenomena, 144-147, (2005), pp. 873-875.

* cited by examiner

*Primary Examiner* — Daniel Gatewood
(74) *Attorney, Agent, or Firm* — Foley & Lardner LLP

(57) ABSTRACT

A process for forming a surface-treatment layer on an electroactive material includes heating the electroactive material and exposing the electroactive material to a reducing gas to form a surface-treatment layer on the electroactive material, where the surface-treatment layer is a layer of partial reduction of the electroactive material.

11 Claims, 3 Drawing Sheets

ELECTRODE MATERIALS

CROSS-REFERENCE TO RELATED APPLICATIONS

This application claims the benefit of U.S. Provisional Patent Application No. 61/349,062, filed on May 27, 2010, the entire disclosure of which is incorporated herein by reference for any and all purposes.

STATEMENT OF GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The present technology is generally related to battery technology.

BACKGROUND

In general, transition metal compounds such as $LiNiO_2$, $LiCoO_2$, $LiMn_2O_4$, $LiFePO_4$, $LiNi_xCo_{1-x}O_2 (0<x<1)$ and $LiNi_yMn_yCO_{1-2y}O_2$ $(0<y<0.5)$, and oxides of these compounds and of lithium are widely used as cathodic materials for lithium batteries. Recently, various composite oxides have been proposed as alternative cathode materials to address the ever increasing demand for higher capacity batteries. One such composite oxide, $xLi_2MO_3 \cdot (1-x)LiMeO_2$, is a solid-solution complex of $Li_2MO_3$ and $LiMeO_2$ where M is one, or more, of Mn, Zr, or Ti; and Me is one, or more, of Ni, Co, Mn, Cr, Fe, V, Al, Mg, or Ti. The complex has a layered structure, with respective layers of $Li_2MO_3$ and $LiMeO_2$, where excess lithium is substituted in the transition metal layer. Although this material offers very high capacity, it suffers from poor rate capability caused by its low conductivity.

SUMMARY

In one aspect, a process is provided including heating an electroactive material; and exposing the electroactive material to a reducing gas to form a surface-treatment layer on the electroactive material. In some embodiments, the reducing gas comprises hydrogen, carbon monoxide, carbon dioxide, an alkane, an alkyne, or an alkene. In some embodiments, the process also includes introducing an inert gas with the reducing gas. In some embodiments, the heating is conducted at a temperature from 80° C. to 1000° C.; from 100° C. to 600° C.; from 150° C. to 500° C.; from 200° C. to 400° C.; or from 250° C. to 350° C. In some embodiments, the exposing is conducted for a period of time from 1 minute to 5 hours; from 10 minutes to 4 hours; from 30 minutes to 4 hours; from 1 hour 4 hours; or from 2 hours to 3 hours. In further embodiments, the exposing is conducted during a cooling after the heating of the electroactive material.

In another aspect, a process is provided including mixing an electroactive material and a reducing agent to form a surface treatment layer on the electroactive material; and removing the reducing agent. In such embodiments, the removing includes vacuuming, filtering, or heating. In some embodiments, the reducing agent is hydrazine, NaH, $NaBH_4$, LiH, $LiAlH_4$, $CaH_2$, oxalic acid, formic acid, diisobutylaluminium hydride, zinc amalgam, diborane, a sulfites, dithiothreitol, or Sn/HCl, Fe/HCl.

In another aspect, a surface-treated electroactive material formed by any of the above processes is provided. The surface-treated electroactive material may be used in a variety of applications. One illustrative application is in a rechargeable lithium battery.

In another aspect, a composition is provided including an electroactive material having a surface treatment layer; where the surface-treatment layer is from 1 nm to 200 nm; and the surface-treatment layer is a layer of the electroactive material which has been partially reduced. Such compositions may be utilized in a variety of applications. Illustrative applications include use in a rechargeable lithium battery, a primary lithium battery, or a secondary lithium battery.

DETAILED DESCRIPTION

Figure 1:
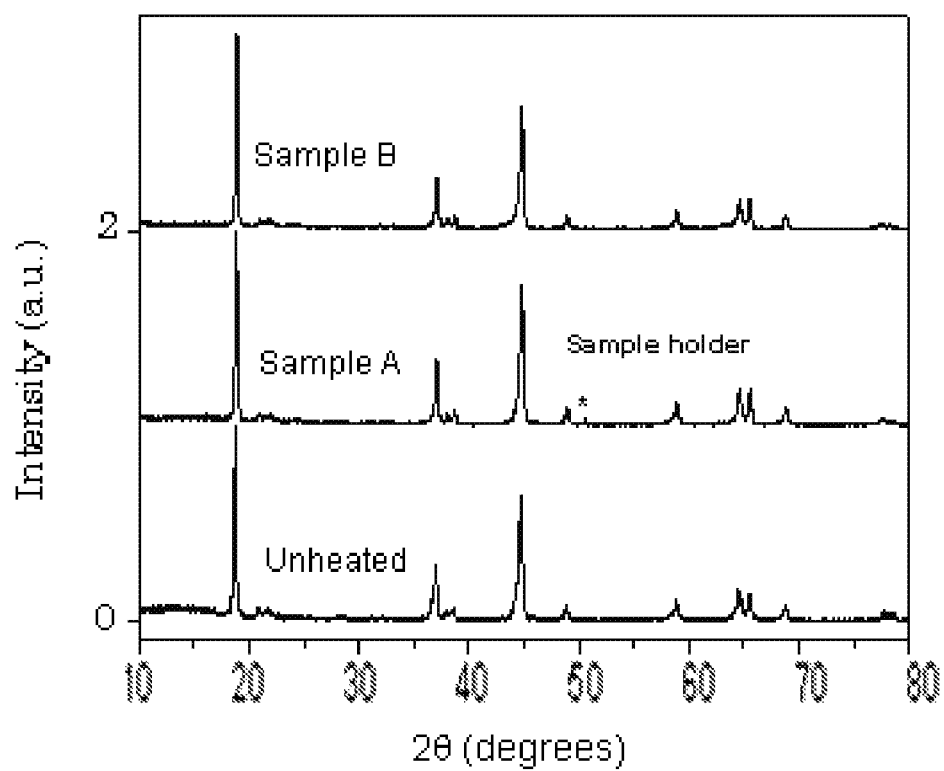
FIG. 1 is an x-ray diffraction (XRD) graph of $Li_{1.2}Mn_{0.5}Ni_{0.176}Co_{0.1}O_2$ after heating in a reducing atmosphere at 250° C. (Sample A) and 350° C. (Sample B), and without heat treatment, according to various embodiments.
Figure 2:
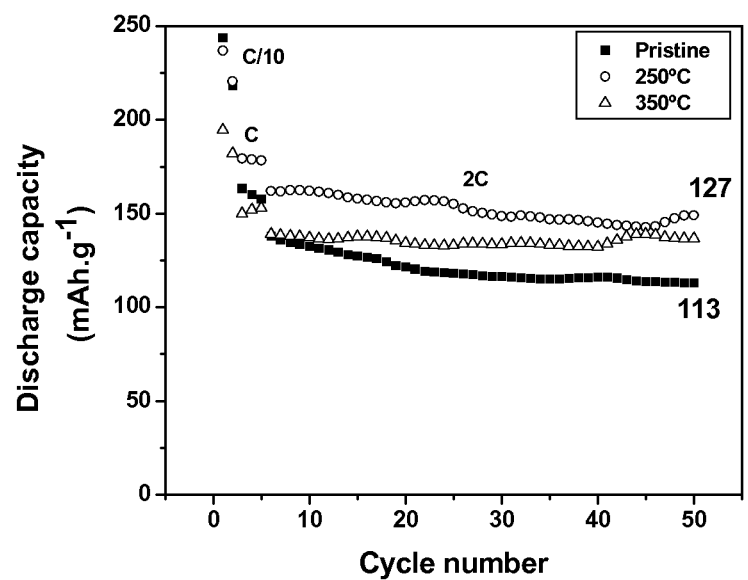
FIG. 2 is a graph illustrating the discharge capacity of samples of $Li_{1.2}Mn_{0.5}Ni_{0.176}Co_{0.1}O_2$ heated under a reducing atmosphere in comparison to that of a sample that was not heated or subjected to a reducing atmosphere, according to one embodiment.

In one aspect, an electroactive material is provided, the electroactive material having a partially reduced surface layer. In some embodiments, such materials are referred to as surface treated electroactive materials. Such electroactive materials having a partially reduced surface layer may be used in a variety of applications. For example, they may be used as cathodes or anodes in primary or secondary lithium batteries. The electroactive materials having a partially reduced surface layer have good electronic conductivities that permit long cycle life and power capabilities. The good electronic conductivity is due to an increase of M-O bond co-valency in the electroactive material, due to the partial reduction of a transition metal.

As used herein the term "partially reduced surface layer" refers to a surface of the bulk electroactive material in which from 0.1 wt % to 3 wt % of the electroactive material is reduced and which is within 200 nm of the outer surface of the material. In other words, 0.1 wt % to 3 wt % of the electroactive material is reduced on its surface. In some embodiments, the partially reduced surface layer is from 1 nm to 200 nm from the outermost surface of the electroactive material. In other embodiments, the partially reduced surface layer is from 1 nm to 50 nm from the outermost surface of the electroactive material. In yet other embodiments, the partially reduced surface layer is from 1 nm to 10 nm from the outmost surface of the electroactive material.

Both cathodic and anodic materials may have such a partially reduced surface layer. Suitable electroactive materials that are used as positive (i.e. cathodic) active materials include, but are not limited to spinels, olivines, $LiM_aM'_bPO_4$, $LiNi_{1-x''}Co_yMet_zO_2$, $LiMet_{0.5}Mn_{1.5}O_4$, $LiMet_{0.5}Mn_{1.5}O_4$, $Li_{1+x}Ni_\alpha Mn_\beta Co_\gamma Met'_\delta O_{2-z}F_{z'}$, and $A_n B'_2 (XO_4)_3$. In the general formulas of the previous sentence, M and M' are individually metals such as Mg, Al, Ga, B, Zr, Ti, Ag, Cu, Mn, Fe, Co, Na, Ni, Zn, V, Cr, and Mo; Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B' is Ti, V, Cr, Fe, or Zr; X is P, S, Si, W, or Mo; and $0 \leq a \leq 2$, $0 \leq b \leq 2$, $0 \leq x'' \leq 0.3$, $0 \leq y \leq 0.5$, $0 \leq z \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$, where $a+b>0$; and $0 \leq n' \leq 3$. In some embodiments, a positive active material includes $LiCoPO_4$, $LiFePO_4$, $LiNiPO_4$, $LiCoO_2$, $LiNiO_2$, $LiMn_{0.5}Ni_{0.5}O_2$, $LiMn_{0.3}Co_{0.3}Ni_{0.3}O_2$, $LiMn_2O_4$, $LiFeO_2$, or vanadium oxide.

Suitable electroactive materials that are used as negative (i.e. anodic) active materials include, but are not limited to, $Li_4Ti_5O_{12}$, $TiO_2$, $LiMO_x$, nitrides ($Li_\alpha M_\beta N_{\gamma'}$) where M is a transition metal, phosphides ($M_\alpha P_{\beta'}$) where M is a transition metal, intermetallic compounds ($M_\alpha M'_\beta X'$) where M and M' are transition metals and X' is Al, Mg, Sb, Sn, Si, Ti, Ge, Ga, Na, B, or metal oxides ($M_\alpha O_{\beta'}$) where M is a transition metal.

In some embodiments, the electroactive materials, anodic or cathodic, include a coating. Such coatings may include, but are not limited to, $Al_2O_3$, $ZrO_2$, $SiO_2$, $MgO$, $TiO_2$, $CaO$, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, $MnO$, $MnO_2$, $CoO$, $Co_2O_3$, $NiO$, $NiO_2$, $CuO$, $ZnO$, $MgF_2$, $AlF_3$, $CaF_2$, Mo, Ta, W, Fe, Co, Cu, Ru, Pd, Pt, Al, Si, and Se. In embodiments where the electroactive material includes a coating, the partial reduction may be conducted before, or after, coating.

In another aspect, a process is provided for preparing the electroactive materials having a partially reduced surface, which includes exposing an electroactive material to a reducing atmosphere. In some embodiments, the process includes heating an electroactive material, and then exposing the electroactive material to a reducing gas to form the surface-treatment layer on the electroactive material. According to one embodiment, the heating is to a temperature from 80° C. to 1000° C. In other embodiments, the heating is to a temperature from 100° C. to 600° C. In other embodiments, the heating is to a temperature from 150° C. to 500° C. In other embodiments, the heating is to a temperature from 200° C. to 400° C. In other embodiments, the heating is to a temperature from 250° C. to 350° C. The exposing is then done either during the heating, at a temperature that is a maximum temperature, or during a cooling step.

The temperature during exposure of the gas to the electroactive material, and the length of time in which the gas is exposed to the electroactive material together determine the extent to which the material is reduced. Longer exposure times will lead to greater reductions and higher temperatures can lead to greater reduction rates.

According to one embodiment, the exposing is conducted during a cooling step after the heating of the electroactive material. Thus, the electroactive material is heated under an inert atmosphere to a maximum temperature and then the material is cooled. During the cooling phase a reducing atmosphere is exposed to the electroactive material for a time that is sufficient to partially reduce the surface of the electroactive material. The temperature at which the reducing atmosphere is exposed to the electroactive material is sufficient to effect the partial reduction. In some embodiments, the exposing is conducted for a period of time from 1 minute to 5 hours. In various other individual embodiments, the exposing is conducted for a period of time from 10 minutes to 4 hours; from 30 minutes to 4 hours; from 1 hour 4 hours; or from 2 hours to 3 hours. In other embodiments, the temperature that is sufficient to effect the partial reduction of the electroactive material is from 80° C. to 1000° C. In various other individual embodiments, the temperature that is sufficient to effect the partial reduction of the electroactive material is from 100° C. to 600° C. or from 150° C. to 500° C. In other embodiments, the temperature that is sufficient to effect the partial reduction of the electroactive material is from 200° C. to 400° C. In yet other embodiments, the temperature that is sufficient to effect the partial reduction of the electroactive material is from 250° C. to 350° C.

The reducing atmosphere is produced by the introduction of a reductant gas to the chamber in which electroactive material is being heated or cooled. The reducing atmosphere may be either neat, or mixed with an inert gas. Suitable reducing gases include, but are not limited to, hydrogen ($H_2$), carbon monoxide (CO), carbon dioxide ($CO_2$), ammonia ($NH_3$), alkanes, alkenes, or alkynes. In some embodiments, the reducing gas is hydrogen. Suitable inert gases include, but are not limited to, He, $N_2$, or Ar. In some embodiments, the reducing gas is hydrogen and the inert gas is helium.

Where the reducing atmosphere is a mixture of an inert gas and a reducing gas, the amount of reducing gas in the mixture may be varied and aid in determining the amount of partial reduction of the electroactive material. Thus, in some embodiments, the reducing gas is present from 1 vol % to 10 vol % of the reducing atmosphere. In other individual embodiments, the reducing gas is present from 2 vol % to 5 vol %, or from 3 vol % to 4 vol % of the reducing atmosphere.

In another aspect, another process is provided for preparing electroactive materials, in which the process includes exposing an electroactive material to a reducing compound in a solvent for a time sufficient to cause partial reduction of a surface layer of the electroactive material. Such processes include mixing an electroactive material and a reducing agent for a time sufficient to form a surface treatment layer on the electroactive material; and then removing the reducing agent. The process may be conducted as a mixture of the electroactive material and reducing agent or in the presence of a solvent. The electroactive materials may be positive or negative active materials as described above. In some embodiments, the removing includes vacuuming, filtering, and/or heating of the mixture to recover the surface treated electroactive material.

The reducing compound may be a material such as, but not limited to, hydrazine, NaH, $NaBH_4$, LiH, $LiAlH_4$, $CaH_2$, oxalic acid, formic acid, diisobutylaluminium hydride, zinc amalgam, diborane, sulfites, dithiothreitol, Sn/HCl, or Fe/HCl.

Where the process is conducted in the presence of a solvent, suitable solvents for the process include those that are compatible with the reducing agent/compound. The electroactive material and/or reducing agent need not be soluble in the solvent. The solvent may dissolve one or more of the components or may act merely as a vehicle for the reduction process. Illustrative solvents include, but are not limited to, diethyl ether, tetrahydrofuran, N-methyl-2-pyrrolidone.

In another aspect, a surface-treated electroactive material formed by any of the above processes is provided. The surface-treated electroactive material has a partially reduced surface layer where from 0.1% to 3% of the electroactive material is reduced. In some embodiments, the surface-treated electroactive material has a partially reduced surface layer where from 0.1% to 2% of the electroactive material is reduced. In some embodiments, the surface-treated electroactive material has a partially reduced surface layer where from 0.5% to 1% of the electroactive material is reduced. The partially reduced surface is within 200 nm of the outer surface of the material. In some embodiments, the partially reduced surface layer is from 1 nm to 200 nm from the outermost surface of the electroactive material.

In another aspect, a rechargeable lithium battery comprising the surface-treated electroactive material.

In another aspect, a composition is provided including an electroactive material comprising a surface treatment layer; where the surface-treatment layer is from 1 nm to 200 nm; and the surface-treatment layer is a layer of the electroactive material which has been partially reduced. In some embodiments, the surface-treatment layer is formed on the active material by exposing the material to a reducing atmosphere for a time sufficient to produce the surface-treatment layer. In other embodiments, the surface-treatment layer is formed on the active material by exposing the material to a reducing agent which is mixed with the electroactive material for a time sufficient to produce the surface-treatment layer. In such other embodiments, after the surface-treatment layer is formed, the reducing agent is removed via vacuum or filtration, or by heating the mixture of the electroactive material and reducing agent. In some embodiments, the surface-treatment layer of the composition is from 5 nm to 50 nm.

In another aspect, a rechargeable lithium battery is provided that includes the above composition.

In another aspect, a primary lithium battery is provided that includes the above composition.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential to the practice of the invention.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

Two samples of $Li_{1.2}Mn_{0.525}Ni_{0.176}Co_{0.1}O_2$ ($0.5Li_2MnO_3 \cdot 0.5LiNi_{0.44}Co_{0.25}Mn_{0.31}O_2$) are heated under a reducing atmosphere of 3.5% hydrogen in helium for three hours. One is heated at 250° C. (Sample A) and the other at 350° C. (Sample B). X-ray diffraction (XRD) analysis (FIG. 1) was used to determine that the materials were stable to such a reducing environment, the heated samples being indistinguishable from the pristine sample that was unheated.

Example 2

Figure 3:
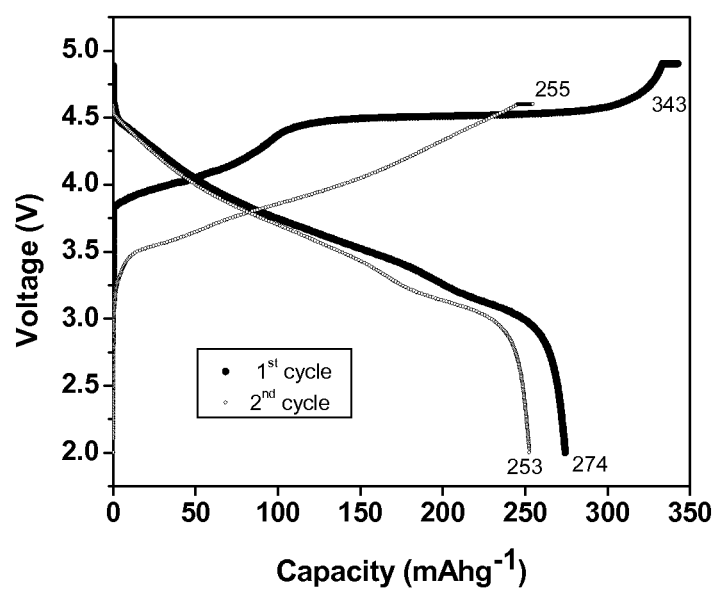
FIG. 3 is a voltage profile of $Li_{1.12}Mn_{0.55}Ni_{0.145}Co_{0.1}O_2$, according to one embodiment.

Samples A and B heated under the 3.5% $H_2$/He gas, and the unheated materials, were then tested in electrochemical generators (CR2032-type coin cells) using lithium metal as a negative electrode and 1.2 M $LiPF_6$ in EC/DEC (3:7 wt %) as an electrolyte. To prepare the cells, a slurry was prepared by mixing Sample A, B, or the unheated material (80 wt %) with carbon black (10 wt %) and polyvinylidene fluoride (PVDF; 10 wt %) in N-methyl-2-pyrrolidone (NMP). The slurry was then deposited on an aluminum current collector to prepare an electrode of the materials. The electrodes were then used in the coin cells, using a loading of 6 mg/cm² of active material. The coin cells were then cycled at various rates. Good rate and charge/discharge capacities were observed for the cells, especially at high rates (See FIG. 3). Sample A exhibited a high capacity at a 360 mA/g current rate, and after 50 cycles more than 128 mAh/g was delivered. Under the same conditions, the unheated sample exhibited only 113 mAh/g as a discharge capacity. The thermal treatment under He/$H_2$ improved the capacity by approximately 13%. Sample B produced an electrode that delivered approximately the same as Sample A, and significantly better than the unheated sample.

Example 3

Another composition of the layer oxide material was tested in a battery configuration. A sample (Sample C) of $Li_{1.12}Mn_{0.55}Ni_{0.145}Co_{0.1}O_2$ is heated in the oven at 200° C. under a reducing atmosphere of 3.5% $H_2$ in helium for 3 hours. A second sample (Untreated 2), was not treated.

Figure 4:
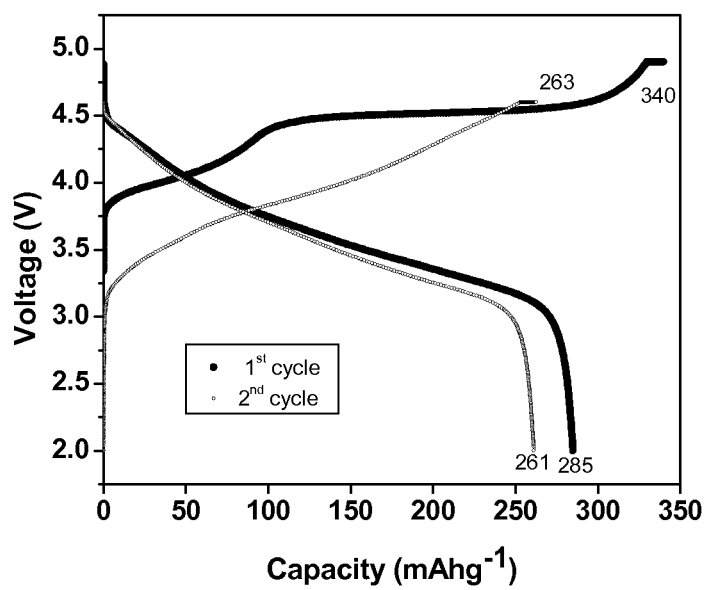
FIG. 4 is a voltage profile of $Li_{1.12}Mn_{0.55}Ni_{0.145}Co_{0.1}O_2$ heated at 200° C. for 3 hours under a $He/H_2$ atmosphere, according to one embodiment.

The samples were then separately prepared in CR2032-type coin cells, using lithium metal as a negative electrode and an electrolyte of 1.2 M $LiPF_6$ in EC/DEC (3:7 wt %). To prepare the cells, a slurry of Sample C and Untreated 2 (80 wt %) with carbon black (10 wt %) and polyvinylidene fluoride (PVDF; 10 wt %) was made in N-methyl-2-pyrrolidone (NMP). The slurry was then deposited on an aluminum current collector. The obtained electrode was used to manufacture coin cells, using a loading of 6 mg/$cm^2$ active material. The voltage profiles of Untreated 2 and Sample C are presented in FIGS. 3 and 4, respectively.

Figure 5:
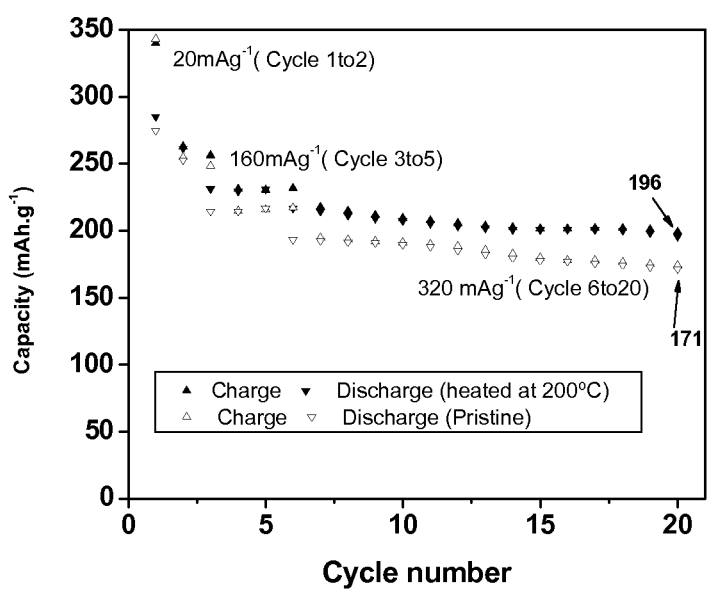
FIG. 5 is a graph of the charge and discharge capacity of untreated and 200° C. $He/H_2$ heat treated $Li_{1.12}Mn_{0.55}Ni_{0.145}Co_{0.1}O_2$, according to one embodiment.

In the first cycle, both materials show a charge capacity about 340 $mAg^{-1}$, with the Sample C material exhibiting a discharge capacity about 285 mA/g and a charge-discharge coulombic efficiency about 84%. The discharge capacity for the untreated material delivers 274 mA/g, with only an 80% charge-discharge coulombic efficiency. The coin cells were then cycled under various rates. Good rate and charge/discharge capacities were observed for the Sample C material. After 20 cycles at a current rate of 320 mA/g current rate, the Sample C material exhibits more than 196 mA/g. This value is 15% higher than the discharge capacity observed for the untreated material which had a capacity of only 171 mAh/g (FIG. 5).

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process of forming a positive active material or a negative active material, the process comprising:
   heating an electroactive material under an inert atmosphere; and
   exposing the electroactive material to $H_2$;
   wherein:
   the exposing is conducted at a temperature of 200° C. to 400° C.;
   the electroactive material is the positive active material or the negative active material;
   the positive active material comprises a spinel, $LiNi_{1-x}Co_yMet_zO_2$, $LiMet_{0.5}Mn_{1.5}O_4$, $LiMet_{0.5}Mn_{1.5}O_4$, $Li_{1+x}Ni_\alpha Mn_\beta Co_\gamma Met'_\delta O_{2-z}F_{z'}$, or $A_nB_2(XO_4)_3$;
   the negative active material comprises $Li_4Ti_5O_{12}$, $TiO_2$, $LiMO_x$, nitrides, phosphides, intermetallic compounds, or a metal oxide;
   M and M' are metals;
   Met is Al, Mg, Ti, B, Ga, Si, Mn, or Co;
   Met' is Mg, Zn, Al, Ga, B, Zr, or Ti;
   A is Li, Ag, Cu, Na, Mn, Fe, Co, Ni, Cu, or Zn;
   B is Ti, V, Cr, Fe, or Zr;
   X is S, Si, W, or Mo;
   a+b>0; and
   $0 \le a \le 2$, $0 \le b \le 2$, $0 \le x \le 0.3$, $0 \le y \le 0.5$, $0 \le z \le 0.5$; $0 \le x' \le 0.4$, $0 \le \alpha \le 1$, $0 \le \beta \le 1$, $0 \le \gamma \le 1$, $0 \le \delta \le 0.4$, and $0 \le z' \le 0.4$; and $0 \le n' \le 3$.

2. The process of claim 1, further comprising introducing an inert gas with the $H_2$.

3. The process of claim 2, wherein the inert gas comprises He, $N_2$, or Ar.

4. The process of claim 2, wherein the $H_2$ is present from 1 vol % to 10 vol %, or from 2 vol % to 5 vol %.

5. The process of claim 1, wherein the exposing is conducted for a period of time from 1 minute to 5 hours.

6. The process of claim 1, wherein the electroactive material comprises the positive active material comprising a spinel, $LiNi_{1-x}Co_yMet_zO_2$, $LiMet_{0.5}Mn_{1.5}O_4$, $LiMet_{0.5}Mn_{1.5}O_4$, $Li_{1+x}Ni_\alpha Mn_\beta Co_\gamma Met'_\delta O_{2-z}F_{z'}$, or $A_nB_2(XO_4)_3$;
   wherein:
   M and M' are metals;
   Met is Al, Mg, Ti, B, Ga, Si, Mn, or Co;
   Met' is Mg, Zn, Al, Ga, B, Zr, or Ti;
   A is Li, Ag, Cu, Na, Mn, Fe, Co, Ni, Cu, or Zn;
   B is Ti, V, Cr, Fe, or Zr;
   X is P, S, Si, W, or Mo; and
   a+b>0;
   $0 \le a \le 2$, $0 \le b \le 2$, $0 \le x \le 0.3$, $0 \le y \le 0.5$, $0 \le z \le 0.5$; $0 \le x' \le 0.4$, $0 \le \alpha \le 1$, $0 \le \beta \le 1$, $0 \le \gamma \le 1$, $0 \le \delta \le 0.4$, and $0 \le z' \le 0.4$; and $0 \le n' \le 3$.

7. The process of claim 1, wherein the electroactive material comprises the positive active material comprising $LiCoO_2$, $LiNiO_2$, $LiMn_{0.5}Ni_{0.5}O_2$, $LiMn_{0.3}Co_{0.3}Ni_{0.3}O_2$, $LiMn_2O_4$, $LiFeO_2$, or vanadium oxide.

8. The process of claim 1, wherein the electroactive material comprises the negative active material comprising $Li_4Ti_5O_{12}$, $TiO_2$, $LiMO_x$, nitrides, phosphides, intermetallic compounds, or a metal oxide.

9. An electroactive material formed by the process of claim 1.

10. A rechargeable lithium battery comprising the electroactive material of claim 9.

11. The process of claim 1, wherein the exposing is conducted during a cooling after the heating of the electroactive material.

\* \* \* \* \*